Jan. 5, 1954 R. D. PAULEY ET AL Re. 23,765

APPARATUS FOR REMOVING BARK FROM LOGS

Original Filed July 12, 1948 5 Sheets-Sheet 1

INVENTORS
ROBERT D. PAULEY
LOUIS A. McCANNA
BY
Cook and Schermerhorn
ATTORNEYS

APPARATUS FOR REMOVING BARK FROM LOGS

Original Filed July 12, 1948 5 Sheets-Sheet 2

INVENTORS
ROBERT D. PAULEY
LOUIS A. McCANNA
BY Cook and Schermerhorn
ATTORNEYS

Jan. 5, 1954 R. D. PAULEY ET AL Re. 23,765

APPARATUS FOR REMOVING BARK FROM LOGS

Original Filed July 12, 1948 5 Sheets-Sheet 3

INVENTORS
ROBERT D. PAULEY
LOUIS A. McCANNA
BY Cook and Schermerhorn
ATTORNEYS

APPARATUS FOR REMOVING BARK FROM LOGS

Original Filed July 12, 1948 5 Sheets-Sheet 4

INVENTORS
ROBERT D. PAULEY
LOUIS A. McCANNA
BY Cook and Ackermerhorn
ATTORNEYS

APPARATUS FOR REMOVING BARK FROM LOGS

Original Filed July 12, 1948 5 Sheets-Sheet 5

INVENTORS
ROBERT D. PAULEY
LOUIS A. McCANNA
BY
Cook and Schermerhorn
ATTORNEYS

Reissued Jan. 5, 1954 Re. 23,765

UNITED STATES PATENT OFFICE 23,765

APPARATUS FOR REMOVING BARK FROM LOGS

Robert D. Pauley, Tacoma, and Louis A. McCanna, Spokane, Wash., assignors to Weyerhaeuser Timber Company, Longview, Wash., a corporation of Washington Original No. 2,576,967, dated December 4, 1951, Serial No. 38,336, July 12, 1948. Application for reissue May 11, 1953, Serial No. 354,442

19 Claims. (Cl. 144—208)

Matter enclosed in heavy brackets [ ] appears in the original patent but forms no part of this reissue specification; matter printed in italics indicates the additions made by reissue.

This invention relates to improved apparatus for removing bark from logs.

Most conventional barking machines remove bark from logs in an inefficient manner and in an unsatisfactory manner for some purposes. Considerable power is usually expended in the bark removal process, and with known apparatus it is substantially impossible to obtain both wood-free bark and bark-free wood. Wood and bark are different, chemically and physically. For most purposes, it is desired to obtain wood free of bark, while for other purposes, such as processes for manufacturing bark products, it is desirable to have the bark free of wood chips and splinters. In a conventional barking machine employing rotary cutters and the like, the bark cannot be removed cleanly from the log without also removing some of the wood, even when the log is truly cylindrical. Often, some parts of the surface of a log are not cylindrical, but more often are out of round and may be fluted with ridges and hollows to make an irregular surface contour which the usual barking tool cannot follow without removing wood from the bulging surfaces.

The general object of the present invention is, therefore, to provide a more efficient log barking machine which effects a cleaner separation between the bark and the wood than conventional barking machines. More specific objects are to provide a barking machine which will remove the bark cleanly from irregular as well as cylindrical portions of logs without leaving bark on the log and without including wood with the removed bark, to provide novel forms of barking tools which remove the bark by simple compression without damage to the underlying wood, instead of by the use of cutting or scraping tools which tend to remove both bark and wood indiscriminately, and to provide a machine for the purpose described which is relatively economical to operate. Reference is made to applicants' copending application, Serial No. 691,762, filed August 20, 1946, for Method of Barking Logs[.], *now Patent No. 2,576,966, of which the present application is a continuation-in-part.*

*As set forth in said Patent No. 2,576,966 the tools act in two ways to remove bark. When the tool rides on the bark the resulting pressure and release effect the desired separation of the bark at the cambium layer. When the tool rides on an area from which bark has already been removed and encounters the edge of bark to be removed, the tool may or may not ride over the edge and continue to ride on the bark. It is a characteristic of the tool as it is positioned on*

*the log that there is a wedging space between the active face of the tool and the wood of the log into which bark is readily crowded and compressed between the tool and the wood. When the tool riding on the wood fails to ride over the edge of the bark which it encounters, at least the inner layer of the bark is crowded into the wedging space, therein compressed, and resultingly sheared from the log at the cambium layer by reason of the relative rotation of the log past the tool. In such action the force of the tool on the log is in part exerted radially onto the wood and in part tangentially of the log on the compressed bark in said wedging space.*

In practicing the invention, a smooth surfaced barking tool of rather small area is pressed resiliently against the bark surface of the log and moved relatively to the log under controlled pressure to ride over irregularities in the bark. The application and sudden release of pressure in this manner as the tool moves over the bark destroys the bond between bark and wood at the cambium layer, causing the bark to separate itself cleanly from the wood. Rupture of the bond may also be due, at least in part, to slippage of the bark under pressure beneath the moving tool. The tool is small enough to ride down in the flutes and hollows of the log surface in the lower part of the tree trunk, whereby the same clean barking action is obtained in the hollows and on high spots as on the true cylindrical portions of the log. Since there is no power driven cutting tool the only power required to operate the apparatus is that necessary to produce relative motion between the smooth tool and the log in order to move the tool over the [bark surface.] *area of the log to be rendered bark-free.*

In preferred embodiments of the invention, the log is mounted for rotation in spur or prong type chucks which are arranged to engage the end surfaces of the log to support and turn the log about its own axis. Movement of the barking tool over the surface of the log is accomplished most conveniently by holding the tool in a relatively stationary position in resilient pressure contact with the rotating log. The effect of the rotation of the log is to cause the tool to travel relatively around the log, and during this travel compression of the bark under the tool is produced by compressed air acting on a piston to urge the tool in a direction approximately radially toward the log. The failure of the bond in the cambium layer causes the bark to break loose from the wood, and so, by feeding the tool lengthwise of the log to make a spiral track on the log, the bark may be removed progressively from one end of the log to the other, or in any other progressive pattern which may be obtained by the combined motions of the rotation of the log and the longitudinal travel of the tool.

In its preferred embodiments, the barking tool has a bluntly rounded smooth surface adapted to ride over irregularities on the bark and exert the same compressive force progressively on different areas of the cambium layer. The tool may have a smooth face to slide over the bark, or it may take the form of one or more rollers to roll on the bark surface, but in either case the tool is made small enough to ride into the flutes and hollows of the log and large enough to ride over the ordinary irregularities found in the bark surface of a large tree, without digging into the bark. Since the tool in any form does not exert a cutting or scraping action, it does not chip or splinter the wood [if allowed to ride] *when it rides* directly on the wood surface after areas of the bark have been removed, and a saving of wood is accomplished. Relatively less power is required to turn the log under the sliding or rolling tool than has heretofore been found necessary to operate known forms of barking machines.

Other objects and advantages will become apparent and the invention will be better understood with reference to the following specification containing a detailed description of certain preferred embodiments illustrated in the accompanying drawings. It is understood that the forms of the invention shown and described are for the purpose of illustration only and are not intended to limit the invention, as various changes in the construction and arrangement of parts will occur to persons skilled in the art and all such modifications within the scope of the appended claims are included in the invention.

Figure 4:
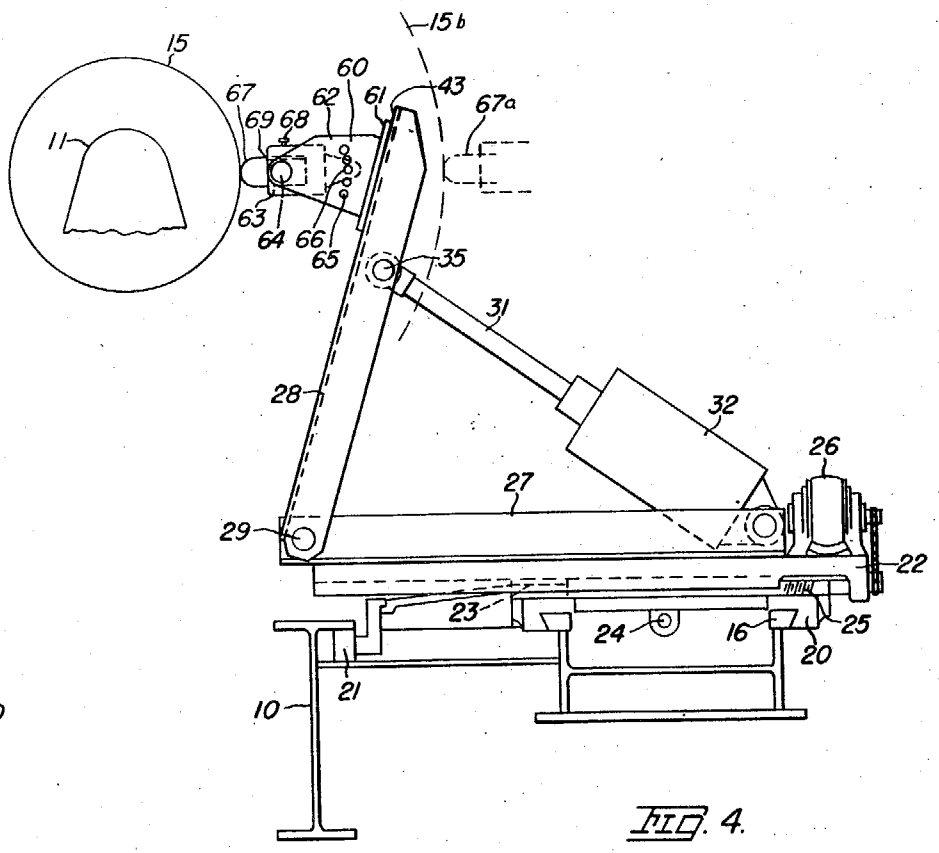
Figure 4 is an end elevation of a second embodiment of barking machine utilizing the principles of the invention.
Figure 9:
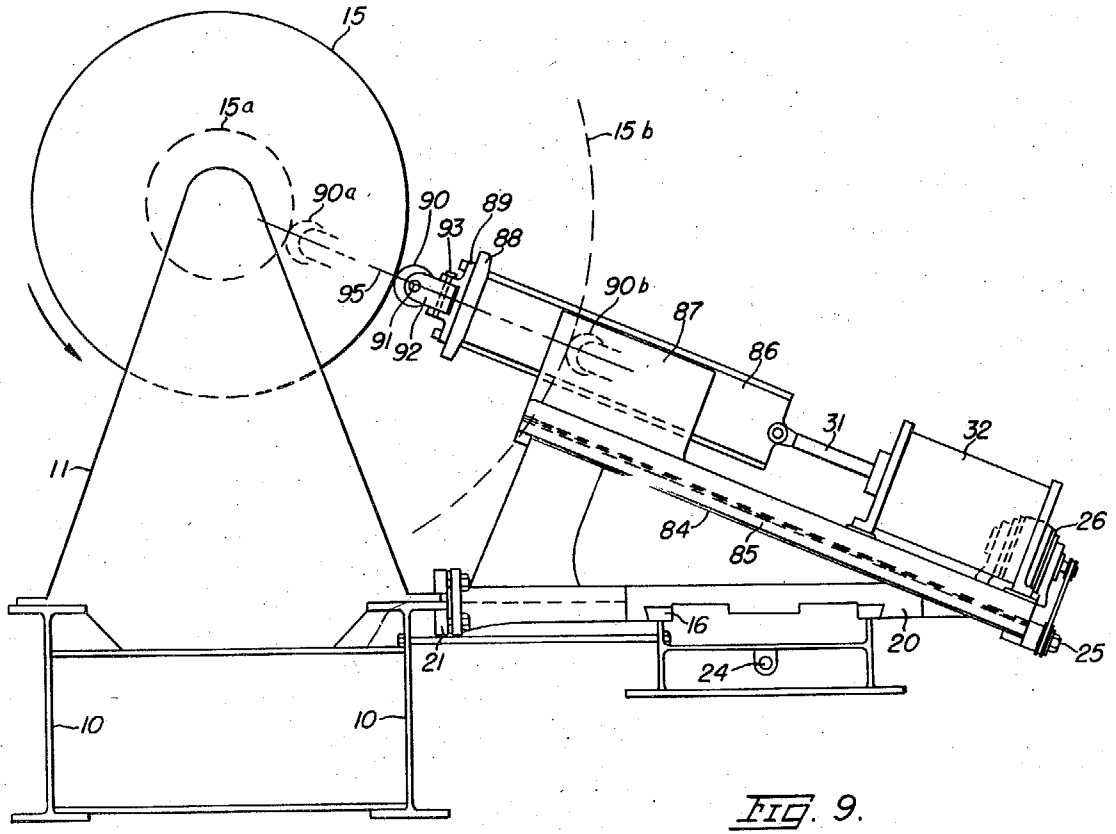

Figures 5 to 8, inclusive, are perspective views of different types of barking tools for use in the machine shown in Figure 4;

Figure 9 is an end elevation of another embodiment of barking machine; and

Figure 10:
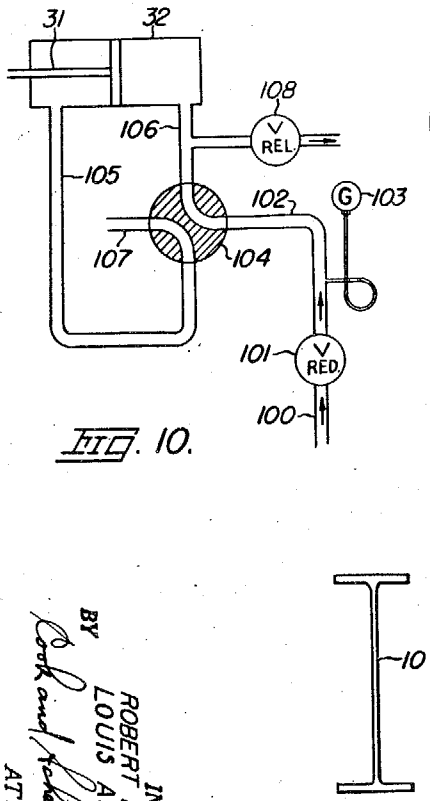
Figure 5:
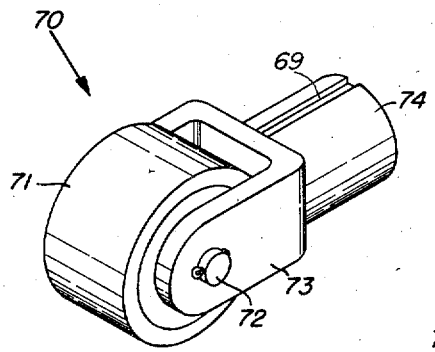

Figure 10 is a schematic diagram of a compressed air system for the barking machine.

Figure 1:
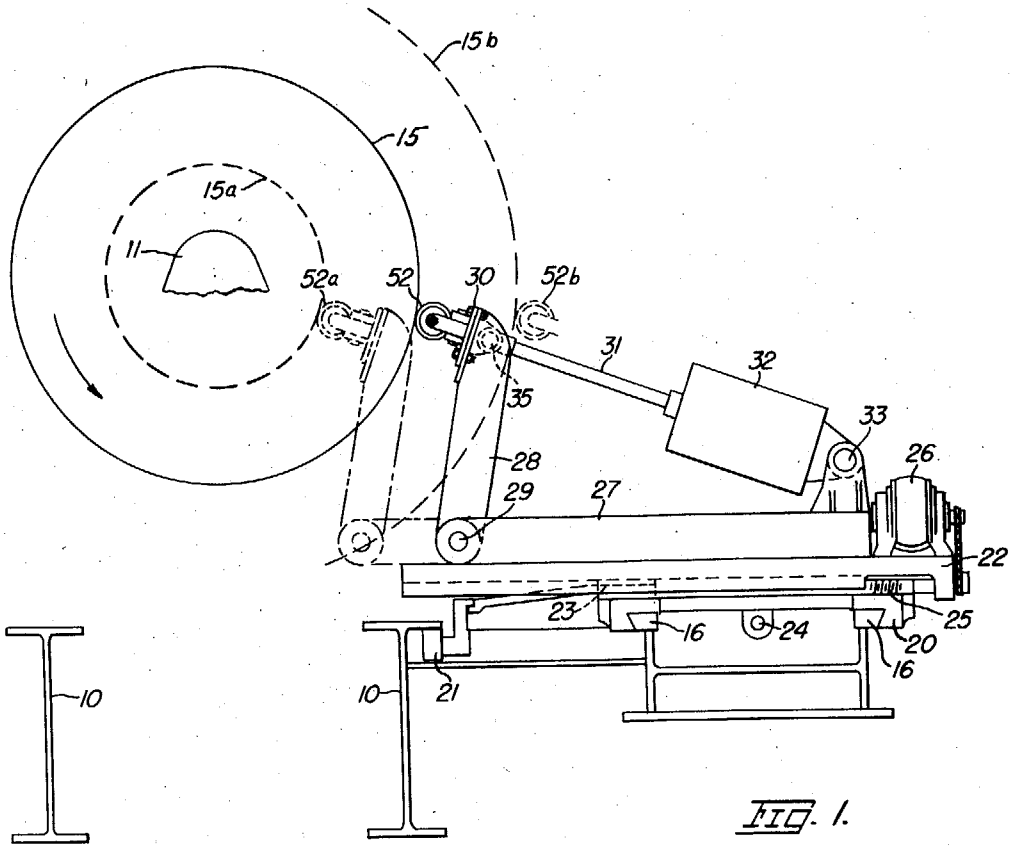
Figure 1 is an end elevation of one form of barking machine embodying the principles of the invention.
Figure 2:
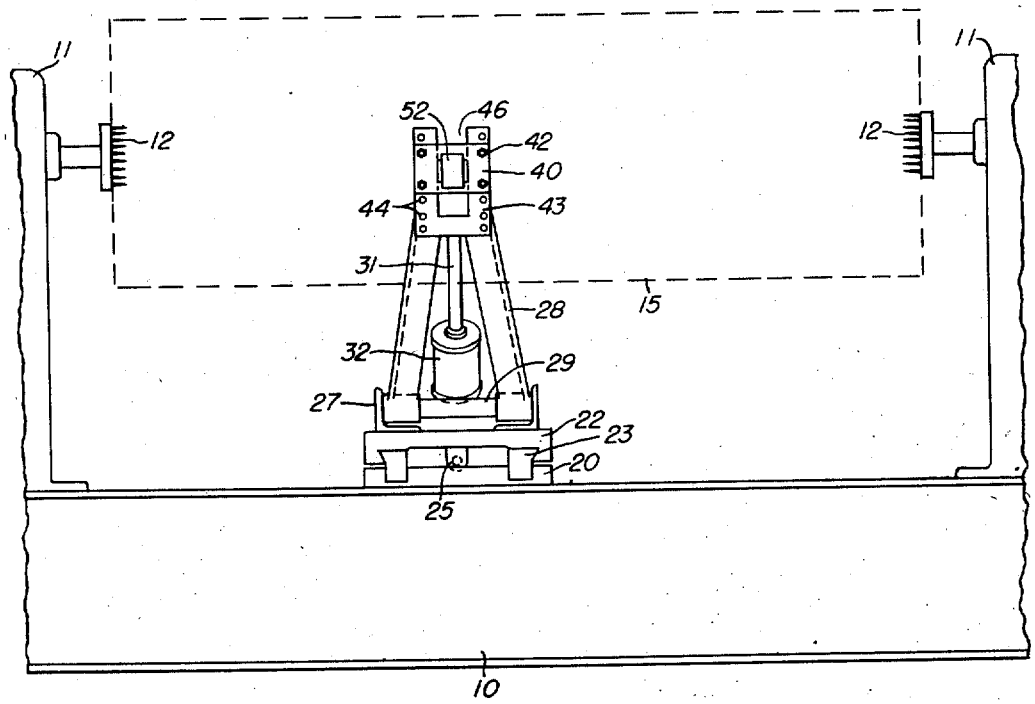
Figure 2 is a side elevation of the barking machine as seen from the left of Figure 1.

Referring first to the embodiment shown in Figures 1 and 2, the numeral 10 designates a pair of heavy I-beams forming the base for the log supporting and turning apparatus. Mounted on the base members 10 are end supports 11 having suitable bearings and driving mechanism for a pair of spur or prong type chucks 12 which are adapted to engage the ends of the log as shown. At least one of the chucks is retractible in an axial direction to permit the log to be inserted and centered between the two chucks, and suitable means, forming no part of the present invention, are included for moving the retractible chuck or chucks into engagement with the end of the log with sufficient force to embed the prongs of both chucks into the log to support the log. The chucks are driven through suitable speed control mechanism to rotate a log at the desired speed for a barking operation. A log to be barked is placed in the chucks and removed therefrom by an overhead crane or other suitable handling mechanism which may be entirely removed from the log so that the latter will be supported only by the two chucks during a barking operation. In Figure 1, the numerals 15a, 15 and 15b designate small, medium and large size logs, respectively, which may be accommodated in the barking machine. In Figure 2 the log is shown in phantom outline to disclose the barking head behind the log.

Adjacent and parallel with the base members 10 of the log turning apparatus are tracks or ways 16 to support a carriage 20 for travel along the length of the log, the carriage being equipped with rollers 21 to ride under the upper flange of one of the beams 10 to hold the carriage down. The carriage supports a cross slide 22 for transverse movement on ways 23, which cross slide forms a bed plate or platform to carry the barking head and the operator. The carriage 20 is moved on its ways 16 by a long screw 24, or other suitable means, and the cross slide platform 22 is traversed on its ways 23 by a screw 25 driven by a motor 26 mounted on the slide.

The barking head and its operating mechanism are mounted on a base frame 27 secured to the cross slide 22. The end of the frame 27 adjacent the log carries an upstanding arm 28 in the general form of an A-frame, the legs of which are pivotally mounted on a rocker shaft 29. The upper end of the arm 28 carries a barking head designated generally by the numeral 30. The barking head 30 is provided with a tool to ride on the surface of the bark, and the pivotal mounting of the arm 28 on the rocker shaft 29 accommodates the movement of the tool and barking head resulting from irregularities in the surface of the rotating log, while the cross slide 22 provides for bodily shifting the position of the base frame 27 to bark logs of different diameter.

*When the tool is moving relatively around the log and advancing relatively along the length of the log, the force of the tool on the log is controlled in accordance with the character of the tool, the kind of wood, and conditions of the bark, so that the debarking is effected without injurious compression of the wood, as described in said Serial No. 691,762, now Patent No. 2,576,966. Means is provided yieldingly to maintain a continuous applied force of the tool on the log and preferably to maintain it substantially constant as the tool moves toward and away from the log center because of variations in the contour being traversed by the tool. A substantially constant but yielding force may be provided, for example, by fluid-pressure means such as a piston in an air-cylinder connected to a supply of air at controlled constant pressure.* The tool in the barking head is pressed against the log with considerable force by a piston rod 31 connected with a piston in a double acting air cylinder 32. The lower end of the cylinder is pivotally mounted on a pin 33 in the frame 27, and the upper end of the piston rod is pivotally connected with the barking head 30 by a pin 35. By the use of a suitable three-way control valve accessible to an operator on the cross slide platform 22, air under pressure may be introduced into the lower end of the cylinder to press the barking tool against the rotating log to remove the bark from the log, and the barking head may be retracted away from the log by venting the lower end of the cylinder and introducing compressed air into the upper end of the cylinder. Adjacent the control valve for the cylinder 32 are other controls for the motor 20 and for the motor which drives the screw 24. In operation, the cross slide platform 22 is placed at a distance from the log which will allow the piston free movement to respond to the eccentricity of the log without reaching either end of its stroke.

Figure 3:
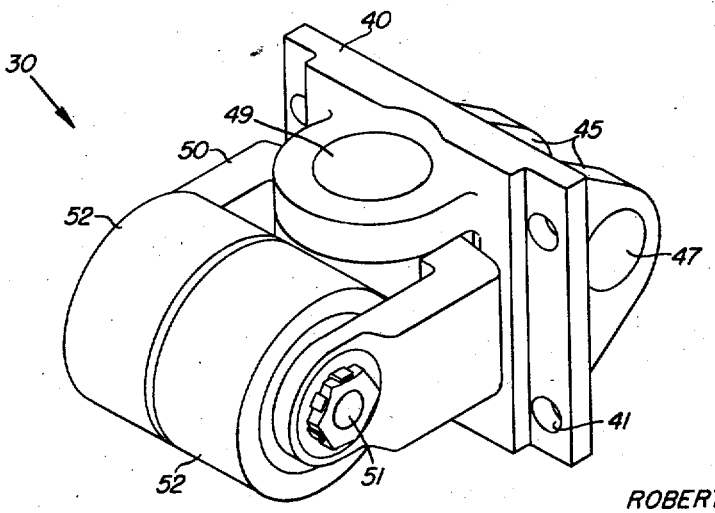
Figure 3 is an enlarged perspective view of the barking head shown in Figures 1 and 2.

The details of the barking head 30 are shown in Figure 3. The head has a flat base plate 40 provided with holes 41 to receive bolts or screws 42 to secure the base plate to a flat face 43 on the upper end of the arm 28. The face 43 is considerably longer in a vertical direction than the base plate 40, and [a] *two* series of holes 44 are provided for the purpose of vertical adjustment so that the head may be mounted in a high or low position on the arm. A pair of ears 45 on the rear side of the base plate 40 project through a vertical slot 46 to receive the piston rod pin 35 in holes 47. On its front side the base plate 40 carries a vertical pin 49 to mount a rocking holder 50. In the present embodiment the holder 50 is in the general form of a yoke having outstanding arms to support the ends of a shaft 51 [for a pair of rollers 52 which constitute the barking tool] *positioned substantially parallel to the axis of the log. On the shaft 51 is a pair of independently rotatable cylindrical rollers 52 of substantially the same diameter positioned end to end, which rollers constitute the barking tool.* Only a small amount of rocking movement is necessary for the holder 50 on the pin 49 to allow the rollers 52 to lie flat against the surface of [the] *a non-cylindrical* log in order to apply uniform pressure over the line of contact with the log. Since thick bark is quite resilient, the rollers 52 actually contact the bark over a considerable area of the rollers, and the rocking pivotal action afforded by the pin 49 tends to equalize the distribution of unit pressure applied to the bark by different parts of the rollers.

The barking machine is adapted to be made to physical dimensions to handle a wide range of log sizes. To accommodate logs of different length one of the end supports 11 may be mounted for longitudinal travel on the base members 10. The travel of the cross slide 22 accommodates logs of different diameter. The present machine is suitable for barking logs from 18" to 96" in diameter. In barking small logs such as log 15a in Figure 1 the cross slide is moved toward the log as shown in broken lines to place the barking tool in the position indicated at 52a. In barking large logs such as log 15b the slide is moved back to place the tool in the position designated 52b. The cylinder 32 is of a length to provide a piston stroke giving a tool movement in excess of the eccentricity of the logs to be treated.

Figure 4 shows the same general form of barking machine having a different type of barking head, similar parts of the machine being identified by the same reference numerals. In this case, the pin 35 for the outer end of the piston rod is mounted directly in the A-frame arm 28 independent of the barking head 60. The barking head 60 has a base plate 61 by which it is secured to the face 43 of the vertical arm, as in the previous embodiment. The base plate 61 carries a pair of spaced vertical plates 62 forming a cradle for a tool holder 63. The tool holder 63 is disposed between the two vertical plates 62 and is equipped with horizontal trunnions 64 mounted in bearings in said plates to allow the tool holder to swing in a vertical plane. [A series of] *Pairs of axially alined* holes 65 are provided in the cradle plates 62 to receive a pin 66 engaging the inner end of the tool holder to hold it in adjusted angular position on its trunnions. The tool holder is provided with a cylindrical bore constituting a socket to receive a barking tool 67. A set screw 68 in the holder engages a longitudinal groove 69 in the tool to secure the tool and prevent it from twisting in the holder.

In Figure 4 the parts are shown in full lines in adjusted position to bark a rather small log 15. The barking tool 67 is in a horizontal position on a level with the axis of the log and radially directed toward the center of the log. When a larger log 15b is to be barked, the barking head and the arm 28 may be operated in substantially the same relative working position by merely drawing back the slide 22 to place the barking tool in the position indicated in broken lines at 67a. The positions of the parts may be changed at will, however, and the working angle of the arm 28 may also be varied. The base plate 61 of the barking head may be adjusted up or down on the face 43 and the angle of attack of the tool may be varied by inserting the pin 66 in a different hole 65. It will, therefore, be apparent that it is not essential to have the tool 67 and the trunnion 64 for the tool holder precisely on a level with the axis of the log. The nature of the barking tool is such that the angle of attack of the barking tool with respect to the surface of the log is not critical, but the above described construction enables the operator to maintain the same angle of attack on logs of different size if he so desires.

Figures 5 to 8 disclose different forms of barking tools which may be used in the holder 63 in Figure 4. The barking tool 70 comprises a single *cylindrical roller 71 on a horizontal* [roller 71 on a] shaft 72 mounted in a yoke 73 integral with a cylindrical shank 74 to fit the cylindrical socket in the tool holder. The groove 69 engaged by the set screws 68 prevents the roller from twisting in the holder, this roller being shorter than the double rollers previously described so that rocking movement of the roller is not necessary.

Figure 6:
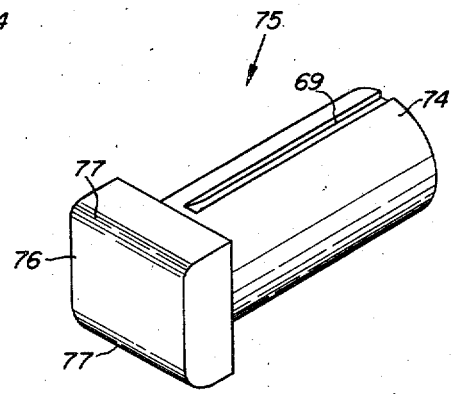
Figure 7:
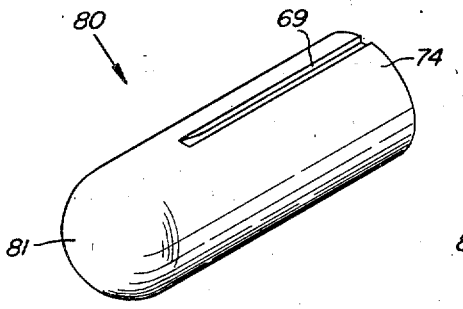
Figure 8:
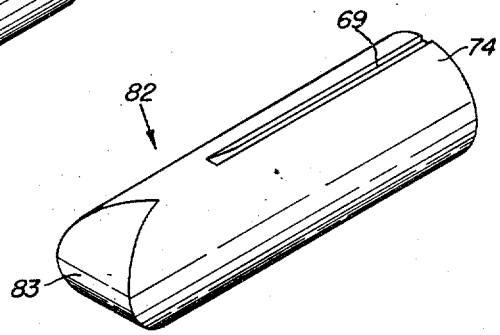

The barking tool 75 shown in Figure 6 has a broad flat, rectangular face 76 with well rounded leading and trailing edges 77. The tool 80 shown in Figure 7 has a rounded working end comprising merely a hemispherical surface 81 formed on the end of the cylindrical shank 74. The tool 82 in Figure 8 has a working end comprising a cylindrical surface 83 having an axis at right angles to the axis of its cylindrical shank 74.

*When the tool rides on the bark the* [The] function of the barking tool in any of its various forms is to compress the bark against the relatively harder underlying wood and then suddenly release the pressure, to cause failure of the bond between the bark and the wood in the cambium layer so that the bark will separate itself cleanly from the log without leaving bark on the wood and without getting any wood in the bark. It is also possible that the moving tool produces some slipping of the bark under compression, to assist in rupturing the bond. As the barking tool is pressed against the log with controlled force and the log is rotated under the tool, the area [under compression moves to subject all the bark on the log to the same treatment.] *of bark under compression moves until the tool rides into an area of bared wood. Then the tool either climbs back onto the bark, or the combined wedging and shearing action takes place while the tool remains on the wood.* The barking tool in its various forms is adapted to ride over the irregularities in the bark and to subject the hollows and depressions often found at the base of a tree between the branching roots to the same pressure treatment as the cylindrical part of the trunk to remove the bark uniformly from all parts of the log. When the log is non-circular in cross section there may be considerable pivotal movement of the vertical arm 28, and for this reason the fluid medium in the cylinder 32 should be an elastic fluid such as compressed air which will maintain a resilient force against the marking tool. [Likewise, after chunks of bark have broken off, the tool rides on the bare surface of the wood for part of a revolution and then climbs back over the edge of adhering bark to continue its travel on the bark surface, involving movement of the arm 28.] Pieces of bark which have been loosened by failure of the bond in the cambium layer may be sheared off by the barking tool as it continues to ride for a distance on the bare wood, but the successful functioning of the tool does not depend on shearing [or scraping] action. The barking operation may be started at any point even on a true cylindrical log with a smooth bark surface where there is no [scraping of] shearing action.

The best size and shape for the barking tool depend to some extent on the size of the log and the nature of the bark within certain limitations. The tool must be small enough to apply sufficient pressure to produce failure of the bond in the cambium layer with a reasonable force on the piston rod which may be obtained in a practical design of apparatus using compressed air, but, on the other hand, the tool must not bear on a sharp edge or be of such a shape that it will tend to dig through the bark to scrape continuously on the bare wood. A scraping action with a thin edge under high pressure splinters and removes some of the wood, which thereby contaminates the bark and impairs the usefulness of the log. The present forms of tools are designed either to roll or slide freely on the surface of the log, and when they encounter bare areas of wood they move over the surface without crushing or splintering the wood. The force applied to the tool must be sufficient to compress the bark but insufficient to crush the wood when the tool rides on the bare wood surface. *The tools illustrated have shapes such that the working face of each may be so positioned in action relative to the surface of the log being barked that there is a wedging space between said face and the wood surface of the log into which bark at the cambium layer may be both crowded for release by the resulting shearing action and compressed to take part of the applied force.*

*The term "progressive contour-riding bark-compressing tool" as used herein and in the accompanying claims signifies a tool having small dimensions relative to the diameters of the logs to be barked thereby, and having a working end structure and size such that when the tool is in operation, by progressively advancing over the log with substantially radial yielding force for riding over irregularities of the log's contour, it is incapable of crushing, cutting, scraping or splintering the wood, because of the wedging space between it and the underlying wood into which space bark is crowded and compressed. In other words, it has an advancing face, either fixed or rotary, with a forward relief, as it is positioned on the log, to ride onto at least the innermost layer of the bark to effect the desired ultimate compression of the underlying bark onto the cambium layer, with forced slippage of the compressed bark along the cambium layer as a result of the relative and progressive advance of the tool over the log.* A blunt rolling or sliding tool having the described characteristics and operating in the manner specified is herein designated, and distinguished from prior forms of cutting and scraping tools, by the term bark-compressing tool.

Figure 9 illustrates another embodiment of machine in which similar parts of the common structure are identified by the same reference numerals. In this embodiment the carriage 20 carries an inclined way 84 for a cross slide 85 having the usual feed screw 25 driven by the electric motor 26. The piston rod 31 is connected with a cross head 86 for reciprocation in guides 87 mounted on the cross slide 85. The cross head 86 is elongated to extend beyond the slide and provided at its outer end with a plate 88 for mounting a holder 89 for the barking tool 90. Different forms of barking tools may be employed, as hereinabove described, but the barking tool 90 comprises a roller mounted on a pin or shaft 91 in a yoke member 92 which has limited rocking movement on a pin 93.

The parts are shown in full line position for barking a medium size log 15, but the cross slide 85 may be advanced to place the barking tool in the position indicated at 90a to engage a small log 15a, or the cross slide may be retracted to place the barking tool in a position 90b to engage a large log 15b. The numeral 95 designates the line of action of the barking tool, both by travel of the cross slide 85 and by the stroke of the cross head and piston rod. This line of action 95 is preferably approximately radial to the log.

In the various embodiments hereinabove described, it is intended that the cross slide shall be positioned after a log is chucked, so that the available stroke of the piston will accommodate all the irregularities and eccentricity of the log and provide a little additional travel to retract the tool away from engagement with the log when the piston is moved to the lower end of the cylinder. It has been stated hereinabove that the barking operation may be commenced at any point on a given log, but in the interest of eliminating unnecessary movements it is preferred to begin the barking operation at one end of the log and to rotate the longitudinal feed screw 24 continuously to move the carriage slowly along the log so that the barking tool will make a spiral track as the log revolves. The speed of the screw 24 and the air pressure employed in the cylinder may be varied to obtain the most efficient bark removal in accordance with the size of the log and condition of the bark and the screw may be stopped or speeded up from time to time as required by variations in the condition of the bark along the log. If the log has considerable taper, the cross slide may be readjusted whenever necessary so that the piston will never reach the end of its stroke in the cylinder.

The arrangement of the operator's control platform on the cross slide, with its control switches for the feed screws and three-way valve for the compressed air cylinder, is not shown, as these features are well understood in the art and may take various forms, depending upon the requirements of the particular installation. Figure 10 is a schematic diagram of a compressed air system for the air cylinder in the illustrated embodiments. The pressure from supply line 100 is controlled or reduced by an adjustable pressure regulating valve 101 connected with a pipe 102 having a gauge 103. The three position valve 104 is manually operable to connect the pipe 102 with either end of the cylinder, through flexible air lines 105 and 106, the opposite end of the cylinder in each case being vented through exhaust pipe 107. A relief valve 108, set to open at a pressure slightly above the pressure in pipe 102 maintained by the regulating valve 101, is connected in pipe 106 leading to the lower end of the cylinder to relieve excess pressure which would otherwise be produced when the piston is pushed back by the cam action of an eccentric log.

*In the foregoing there has been described the removal of bark on a log by means which applies a continuous pressure at a small area of a log to be barked and by means which moves that area relatively around the log and relatively along the length of the log. Although the preferred and illustrated means for doing this rotates the log past the tool as it moves along the length of the log, it is to be understood that other means known in the barking art may be adopted to effect the same relative movements.*

It will be apparent to persons skilled in the art that the apparatus is capable of still further modification, and that in all its various forms the present barking machine provides an economical apparatus for obtaining bark-free wood and wood-free bark which has not heretofore been obtainable at low cost without waste. It will also be appreciated that the wood which was previously lost or wasted with the removal of the bark is thereby saved and may be converted into useful products.

Having now described our invention and in what manner the same may be used, what we claim as new and desire to protect by Letters Patent is:

1. A log barking machine comprising means for supporting a log for rotation about its longitudinal axis, a carriage movable along the log, a blunt barking tool having a smooth bark engaging surface of sufficient contact area to ride over irregularities in the bark but having small dimensions relative to the diameters of the logs to be barked to follow the contours of irregular logs, means for mounting said tool on said carriage for movement approximately radially of the log, and gas pressure operated means for yieldably holding said tool against the log with substantially continuous steady pressure as the log rotates.

2. A log barking machine comprising means for supporting a log for rotation about its longitudinal axis, a carriage having relative movement longitudinally of the log, an arm pivotally mounted on said carriage, a blunt barking tool mounted on said arm for movement approximately radially of the log, said barking tool having small dimensions relative to the diameters of the logs to be barked to follow the contours of irregular logs, and a gas cylinder and piston unit on said carriage connected with said arm for yieldably holding said tool against the log with substantially continuous steady pressure as the log rotates.

3. A log barking machine comprising means for supporting a log for rotation about its longitudinal axis, a blunt barking tool having small dimensions relative to the diameters of the logs to be barked to follow the contours of irregular logs, means for mounting said tool for relative movement longitudinally of the log and movement approximately radially of the log, and a gas pressure operated cylinder and piston unit for yieldingly holding said tool against the log with substantially continuous steady pressure as the log rotates.

4. A log barking machine as described in claim 3 wherein the log engaging portion of said barking tool has a smooth cylindrical surface.

5. A log barking machine as described in claim 4 wherein said barking tool comprises a roller sufficiently small to ride into hollows and depressions in the log surface.

6. A log barking machine as described in claim 3 wherein said barking tool comprises a pair of rollers mounted in end to end relation, said rollers being sufficiently small to ride into hollows and depressions in the log surface.

7. A log barking machine as described in claim 3 wherein said barking tool comprises a pair of rollers on a common shaft, and a rocking mounting for said shaft.

8. A log barking machine comprising means for supporting a log for rotation about its longitudinal axis, a carriage movable along the log, a blunt barking tool having small dimensions relative to the diameters of the logs to be barked to follow the contours of irregular logs, means for mounting said tool on said carriage for movement approximately radially of the log, and gas pressure operated means for yieldably holding said tool against the log with substantially continuous steady pressure as the log rotates.

9. A log barking machine as described in claim 8 wherein said barking tool comprises a roller small enough to ride into hollows and depressions in the surface of a log to be barked, and said means for mounting said tool on said carriage comprises an arm pivoted on said carriage to swing toward and away from the log, and said gas pressure operated means comprises a piston and cylinder unit connected with said arm.

10. A log barking machine as described in claim 8 wherein said barking tool comprises a pair of rollers mounted for rotation on a common shaft, said means for mounting said tool on said carriage comprises an arm pivoted on said carriage to swing toward and away from a log to be barked, means for mounting said roller shaft for rocking movement on said arm, and said gas pressure operated means comprising a cylinder and piston unit connected with said arm.

*11. A log barking machine comprising means for supporting a log with its axis in a substantially fixed axial line, a bark-removing tool having small dimensions relative to the diameters of the logs to be debarked thereby and having a log-engaging surface, said surface in the working position of the tool confronting the log surface at a wedge-shaped angle for receiving and compressing bark against which said surface engages, means for mounting said tool for movement approximately radially of the log when engaging the log, yielding pressure-operated means acting on said mounting means for holding said tool against the log with a continuous substantially constant force, means to effect relative motion of said tool and log circumferentially of the log, and means to effect relative motion of said tool and log lengthwise of the log, whereby said last-mentioned two movements may be controlled to effect a predetermined substantially spiral path of said tool about said log.*

*12. A log barking machine comprising means for supporting a log in endwise fixed position with*

*its axis in a substantially fixed axial line, a bark-removing tool having small dimensions relative to the diameters of the logs to be debarked thereby and having a log-engaging surface, said surface in the working position of the tool confronting the log surface at a wedge-shaped angle for receiving and compressing bark against which said surface engages, a carriage movable lengthwise of the supported log, means for mounting said tool on said carriage for movement approximately radially of the supported log when engaging said log, yielding pressure-operated means acting on said mounting means for holding said tool against the log with a continuous substantially constant force, means to effect relative motion of the log-engaging tool and the log circumferentially of the log, and means to effect movement of the carriage lengthwise of the log, whereby said last-mentioned two movements may be controlled to effect a predetermined substantially spiral path of said tool about said log.*

*13. A log barking machine comprising means for supporting a log for rotation about its longitudinal axis, a bark-removing tool having small dimensions relative to the diameters of the logs to be debarked thereby and having a log-engaging surface, said surface in the working position of the tool confronting the log surface at a wedge-shaped angle for receiving and compressing bark against which said surface engages, means for mounting said tool for movement approximately radially of the log when engaging the log, yielding pressure-operated means acting on said mounting means for holding said tool against the log with a continuous substantially constant force, and means to effect relative movement of said tool and log lengthwise of the log, whereby said last-mentioned movement and said rotation may be controlled to effect a predetermined substantially spiral path of said tool about said log.*

*14. A log barking machine as described in claim 11 wherein the log-engaging portion of said tool has a cylindrical face about an axis substantially parallel to the axis of the log, whereby to ride onto at least the innermost layer of bark for compressing said layer between the tool and the wood of the log.*

*15. A log barking machine as described in claim 14 wherein said tool is a cylindrical roller rotatable on its said axis.*

*16. A log barking machine as described in claim 11 wherein said tool comprises a pair of independently rotatable cylindrical rollers of substantially the same diameter mounted in end to end relation on a common shaft generally parallel to the axis of the log, and a rocking mounting for said shaft at right angles thereto*

*for permitting the two rollers to follow irregularities in the surface of the log.*

*17. A log barking machine as described in claim 11 wherein said tool in its operating position on a log comprises a log-contacting face which advances along the log with forward relief for riding onto at least the innermost layer of the bark and for progressively compressing said layer between said face and the wood of the log whereby the relative advance of the tool around the log progressively effects a shearing separation of the said compressed bark at the cambium layer.*

*18. A log barking machine as described in claim 11 in which the yielding-pressure means comprises a piston connected to said mounting means for moving the same, a cylinder mounted for axial movement of said piston therein, and a constant pressure supply of fluid connected to said cylinder to act on said piston for holding substantially constant the force exerted by the tool on the log.*

*19. A log barking machine as described in claim 11 in which the yielding-pressure means comprises a piston connected to said mounting means for moving the same, a cylinder mounted for axial movement of said piston therein, said cylinder being arranged for fluid pressure therein at each end to move the piston in both directions in said cylinder, and a constant pressure supply of fluid connected to that end of the cylinder which moves the piston to force the tool onto the log whereby a substantially constant force is exerted by the tool on the log.*

ROBERT D. PAULEY.
LOUIS A. McCANNA.

References Cited in the file of this patent or the original patent

UNITED STATES PATENTS

| Number | Name | Date |
|---|---|---|
| 148,161 | Ames | Mar. 3, 1874 |
| 305,322 | Merziger | Sept. 16, 1884 |
| 871,296 | Russell et al. | Nov. 19, 1907 |
| 1,277,808 | Witham | Sept. 3, 1918 |
| 1,673,265 | Pangborn | June 12, 1928 |
| 1,881,465 | Ganes et al. | Oct. 11, 1932 |
| 2,027,173 | Jackson et al. | Jan. 7, 1936 |
| 2,477,922 | Emery et al. | Aug. 2, 1949 |
| 2,581,829 | Alexander | Jan. 8, 1952 |

FOREIGN PATENTS

| Number | Country | Date |
|---|---|---|
| 90,080 | Germany | Jan. 2, 1897 |
| 54,826 | Denmark | June 7, 1938 |